(12) United States Patent
Qian et al.

(10) Patent No.: US 11,165,755 B1
(45) Date of Patent: Nov. 2, 2021

(54) PRIVACY PROTECTION DURING VIDEO CONFERENCING SCREEN SHARE

(71) Applicant: Citrix Systems, Inc., Fort Lauderdale, FL (US)

(72) Inventors: Shihao Qian, Nanjing (CN); Bo Zang, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/073,773

(22) Filed: Oct. 19, 2020

Related U.S. Application Data

(63) Continuation of application No. PCT/CN2020/111793, filed on Aug. 27, 2020.

(51) Int. Cl.
*H04N 7/15* (2006.01)
*H04L 29/06* (2006.01)
*G06F 21/62* (2013.01)
*H04N 5/272* (2006.01)
*G06F 3/14* (2006.01)

(52) U.S. Cl.
CPC ........ *H04L 63/0428* (2013.01); *G06F 3/1454* (2013.01); *G06F 21/6263* (2013.01); *H04N 5/272* (2013.01); *H04N 7/15* (2013.01)

(58) Field of Classification Search
CPC ................................. H04N 7/15; H04N 7/14
USPC .............................. 348/14.01–14.16; 709/204
See application file for complete search history.

(56) References Cited

U.S. PATENT DOCUMENTS

| | | |
|---|---|---|
| 6,937,730 B1 | 8/2005 | Buxton |
| 8,578,504 B2 | 11/2013 | Brown et al. |
| 8,914,892 B2 | 12/2014 | Karande et al. |
| 9,137,232 B2 | 9/2015 | Eschbach et al. |
| 9,268,398 B2 | 2/2016 | Tipirneni |

(Continued)

FOREIGN PATENT DOCUMENTS

| | | |
|---|---|---|
| CN | 102938801 A | 2/2013 |
| CN | 104794405 A | 7/2015 |

(Continued)

OTHER PUBLICATIONS

U.S. Appl. No. 16/716,669, filed Dec. 17, 2019, Singh.

(Continued)

*Primary Examiner* — Melur Ramakrishnaiah
(74) *Attorney, Agent, or Firm* — Daly, Crowley, Mofford & Durkee, LLP

(57) ABSTRACT

Techniques are disclosed for providing privacy protection for video conference screen sharing. An example methodology implementing the techniques includes receiving a video stream of a first participant in a video conference session between at least the first participant and a second participant, wherein the first participant is associated with a first conference client device and the second participant is associated with a second conference client device, and determining that the first participant is performing screen sharing. The method also includes identifying a first item of content in the video stream to shield from being viewable during rendering of the video stream, obfuscating the identified first item of content in the video stream, and providing the video stream showing the obfuscated first item of content to the second conference client device to be rendered for display on a display device of the second conference client device.

18 Claims, 14 Drawing Sheets

(56) References Cited

U.S. PATENT DOCUMENTS

| | | | |
|---|---|---|---|
| 9,466,266 B2 | 10/2016 | Hildreth et al. |
| 9,626,528 B2 | 4/2017 | Butler |
| 9,977,909 B1 | 5/2018 | Austin et al. |
| 10,043,033 B1 | 8/2018 | Hadsall |
| 10,255,053 B2 | 4/2019 | Giri et al. |
| 10,305,683 B1 | 5/2019 | Ghafourifar et al. |
| 10,430,350 B1 | 10/2019 | Nimry et al. |
| 10,552,585 B2 | 2/2020 | Verthein et al. |
| 10,686,824 B2 | 6/2020 | Petry et al. |
| 2006/0075040 A1 | 4/2006 | Chmaytelli |
| 2006/0129948 A1 | 6/2006 | Hamzy et al. |
| 2008/0226199 A1 | 9/2008 | Breglio |
| 2009/0257591 A1 | 10/2009 | Mithal et al. |
| 2010/0161644 A1 | 6/2010 | Crim et al. |
| 2011/0029774 A1 | 2/2011 | Zunke |
| 2011/0032913 A1 | 2/2011 | Patil et al. |
| 2011/0251992 A1 | 10/2011 | Bethlehem et al. |
| 2011/0302442 A1 | 12/2011 | Garrett et al. |
| 2012/0198368 A1 | 8/2012 | Bornheimer et al. |
| 2012/0226742 A1 | 9/2012 | Momchilov et al. |
| 2012/0323717 A1 | 12/2012 | Kirsch |
| 2013/0117670 A1 | 5/2013 | Mahajan et al. |
| 2013/0145457 A1 | 6/2013 | Papakipos et al. |
| 2013/0172027 A1 | 7/2013 | Sturges et al. |
| 2013/0201534 A1 | 8/2013 | Carlen et al. |
| 2013/0339744 A1 | 12/2013 | Nagai et al. |
| 2014/0195798 A1 | 7/2014 | Brugger et al. |
| 2014/0201527 A1 | 7/2014 | Krivorot |
| 2014/0215356 A1* | 7/2014 | Brander ............... G06F 3/14 715/753 |
| 2015/0058997 A1 | 2/2015 | Lee et al. |
| 2015/0200922 A1 | 7/2015 | Eschbach et al. |
| 2015/0278534 A1* | 10/2015 | Thiyagarajan ......... G06F 21/84 726/28 |
| 2015/0288633 A1 | 10/2015 | Ogundokun et al. |
| 2015/0346959 A1 | 12/2015 | Ruben et al. |
| 2016/0054911 A1 | 2/2016 | Edwards et al. |
| 2016/0078247 A1 | 3/2016 | Tucker et al. |
| 2016/0099935 A1 | 4/2016 | Luskin et al. |
| 2016/0112209 A1 | 4/2016 | Yoon et al. |
| 2016/0179454 A1 | 6/2016 | Liu |
| 2016/0188883 A1 | 6/2016 | Wang et al. |
| 2016/0188973 A1 | 6/2016 | Ziaja et al. |
| 2016/0191442 A1 | 6/2016 | Penilla et al. |
| 2016/0269440 A1 | 9/2016 | Hartman |
| 2016/0328522 A1 | 11/2016 | Howley |
| 2017/0249432 A1 | 8/2017 | Grantcharov |
| 2017/0323099 A1 | 11/2017 | Song |
| 2017/0364595 A1 | 12/2017 | Desai et al. |
| 2017/0372527 A1 | 12/2017 | Murali et al. |
| 2018/0014150 A1 | 1/2018 | Elias |
| 2018/0053003 A1* | 2/2018 | Nair ..................... H04W 12/02 |
| 2018/0071634 A1 | 3/2018 | Carvallo et al. |
| 2018/0082068 A1 | 3/2018 | Lancioni et al. |
| 2018/0122506 A1 | 5/2018 | Grantcharov et al. |
| 2018/0136898 A1 | 5/2018 | Shi et al. |
| 2018/0145835 A1 | 5/2018 | Barbour et al. |
| 2018/0150647 A1 | 5/2018 | Naqvi et al. |
| 2018/0183581 A1 | 6/2018 | Elbaz et al. |
| 2018/0191701 A1 | 7/2018 | Kong et al. |
| 2018/0262480 A1 | 9/2018 | Doi et al. |
| 2018/0276393 A1 | 9/2018 | Allen et al. |
| 2018/0285591 A1 | 10/2018 | Thayer et al. |
| 2018/0285592 A1 | 10/2018 | Sharifi et al. |
| 2018/0337918 A1 | 11/2018 | Chang et al. |
| 2018/0343321 A1 | 11/2018 | Chang |
| 2018/0351961 A1 | 12/2018 | Calcaterra et al. |
| 2019/0012646 A1 | 1/2019 | Seidl et al. |
| 2019/0013646 A1 | 1/2019 | Tan et al. |
| 2019/0019177 A1 | 1/2019 | Lee et al. |
| 2019/0042059 A1 | 2/2019 | Baer |
| 2019/0050592 A1 | 2/2019 | Grau |
| 2019/0073490 A1* | 3/2019 | Agrawal ............... H04L 63/102 |
| 2019/0080072 A1 | 3/2019 | Van Os et al. |
| 2019/0102263 A1 | 4/2019 | Singh et al. |
| 2019/0102574 A1 | 4/2019 | Roberts et al. |
| 2019/0171794 A1* | 6/2019 | Dhruva ................ H04L 67/306 |
| 2019/0278961 A1 | 9/2019 | Schrader et al. |
| 2019/0327215 A1 | 10/2019 | Bastian et al. |
| 2019/0349366 A1 | 11/2019 | Dewan et al. |
| 2019/0386971 A1 | 12/2019 | Venkiteswaran et al. |
| 2020/0012793 A1 | 1/2020 | Avraham et al. |
| 2020/0019729 A1 | 1/2020 | Shanmugam et al. |
| 2020/0028836 A1 | 1/2020 | Gandhi et al. |
| 2020/0074090 A1 | 3/2020 | Naqvi et al. |
| 2020/0074109 A1 | 3/2020 | Pieniazek et al. |
| 2020/0106749 A1 | 4/2020 | Jain et al. |
| 2020/0110301 A1 | 4/2020 | Harrold et al. |
| 2020/0151348 A1 | 5/2020 | Chauhan |
| 2020/0193031 A1 | 6/2020 | Avraham et al. |
| 2020/0228561 A1 | 7/2020 | Petry et al. |
| 2020/0310945 A1 | 10/2020 | Scoda |
| 2020/0320638 A1 | 10/2020 | Erickson et al. |
| 2020/0380146 A1 | 12/2020 | Dodor et al. |
| 2021/0051294 A1* | 2/2021 | Roedel ................ G06T 5/002 |

FOREIGN PATENT DOCUMENTS

| | | |
|---|---|---|
| CN | 105162693 A | 12/2015 |
| CN | 106716436 A | 5/2017 |
| CN | 106933465 A | 7/2017 |
| CN | 108509169 A | 9/2018 |
| CN | 110378145 A | 10/2019 |
| CN | 110998573 A | 4/2020 |
| CN | 111338744 A | 6/2020 |
| EP | 2874396 A1 | 5/2015 |
| WO | WO 2013/101084 A1 | 7/2013 |
| WO | WO2016205241 A | 12/2016 |
| WO | WO2018102286 | 6/2018 |

OTHER PUBLICATIONS

U.S. Appl. No. 16/725,295, filed Dec. 23, 2019, Bhaskar S, et al.
U.S. Appl. No. 16/716,761, filed Dec. 17, 2019, Singh.
U.S. Appl. No. 16/835,928, filed Mar. 31, 2020, Singh.
U.S. Appl. No. 16/870,056, filed May 8, 2020, Jiang, et al.
U.S. Appl. No. 16/369,648, filed Mar. 29, 2019, Singh, et al.
U.S. Appl. No. 16/910,615, filed Jun. 24, 2020, Qiao, et al.
U.S. Appl. No. 17/034,118, filed Sep. 28, 2020, Wang, et al.
U.S. Appl. No. 16/185,724, filed Nov. 9, 2018, Chauhan.
U.S. Appl. No. 16/780,445, filed Feb. 3, 2020, Singh, et al.
European Search Report and Written Opinion dated Mar. 31, 2020 for EP Application No. 19207955.6; 9 Pages.
Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.
"IBM Researchers Develop Shield to Mask Sensitive On-Screen Info" Downloaded from https://www.firstpost.com/business/biztech/ibm-researchers-develop-shield-to-mask-sensitive-on-screen-info-1873185.html; Jul. 10, 2009; 11 pages.
Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.
U.S. Non-Final Office Action dated Jun. 6, 2019 for U.S. Appl. No. 16/185,724; 11 Pages.
U.S. Final Office Action dated Oct. 23, 2019 for U.S. Appl. No. 16/185,724; 12 Pages.
U.S. Non-Final Office Action dated Mar. 24, 2020 for U.S. Appl. No. 16/185,724; 11 Pages.
U.S. Final Office Action dated Sep. 9, 2020 for U.S. Appl. No. 16/185,724; 11 Pages.
PCT International Search Report and Written Opinion dated Oct. 27, 2020 for International Application No. PCT/US2020/051150; 12 Pages.
U.S. Non-Final Office Action dated Dec. 10, 2020 for U.S. Appl. No. 16/780,445; 36 pages.
U.S. Non-Final Office Action dated Feb. 16, 2021 for U.S. Appl. No. 17/034,118; 15 pages.

(56) References Cited

OTHER PUBLICATIONS

PCT International Search Report and Written Opinion dated Feb. 23, 2021 for International Application No. PCT/CN2020/091951; 9 pages.
PCT International Search Report and Written Opinion dated Feb. 16, 2021 for International Application No. PCT/US2020/061927; 13 pages.
U.S. Non-Final Office Action dated Mar. 15, 2021 for U.S. Appl. No. 16/185,724; 14 pages.
PCT Invitation to Pay Additional Fees dated Mar. 16, 2021 for International Application No. PCT/US2020/062770; 12 pages.
U.S. Non-Final Office Action dated Apr. 13, 2021 for U.S. Appl. No. 16/716,669; 21 pages.
U.S. Non-Final Office Action dated Apr. 30, 2021 for U.S. Appl. No. 16/369,648; 26 pages.
PCT International Search Report and Written Opinion dated May 10, 2021 for International Application No. PCT/US2020/062770; 19 pages.
PCT International Search Report and Written Opinion dated May 26, 2021 for International Application No. PCT/CN2020/111793; 9 pages.
PCT International Search Report and Written Opinion dated Jun. 3, 2021 for International Application No. PCT/CN2020/112315; 9 pages.
U.S. Final Office Action dated Jun. 9, 203721 for U.S. Appl. No. 16/780,445; 37 pages.

\* cited by examiner

PRIVACY PROTECTION DURING VIDEO CONFERENCING SCREEN SHARE

CROSS REFERENCE TO RELATED APPLICATION

This application is a continuation of and claims the benefit of PCT Patent Application No. PCT/CN2020/111793 filed on Aug. 27, 2020 in the English language in the State Intellectual Property Office and designating the Unite States, the contents of which are hereby incorporated herein by reference in its entirety.

BACKGROUND

Video conferencing has become a prevalent mechanism for conducting conferences due, at least in part, to growth of high-speed networks, such as the Internet, and the proliferation of the use of video equipment. Video conferencing enables participants to share video and audio content with each other in real-time across geographically dispersed locations. For example, video conferencing commonly provides a screen sharing mode that allows a participant to share contents rendered on a display with other conference participants. In this manner, video conferencing provides for enhanced communications between participants as compared with audio only conferencing.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include receiving a video stream of a first participant in a video conference session between at least the first participant and a second participant, wherein the first participant is associated with a first conference client device and the second participant is associated with a second conference client device, and determining that the first participant is performing screen sharing. The method may also include identifying a first item of content in the video stream to shield from being viewable during rendering of the video stream, obfuscating the identified first item of content in the video stream, and providing the video stream showing the obfuscated first item of content to the second conference client device to be rendered for display on a display device of the second conference client device.

According to another illustrative embodiment provided to illustrate the broader concepts described herein, a system includes a memory and one or more processors in communication with the memory. The processor may be configured to receive a video stream of a first participant in a video conference session between at least the first participant and a second participant, wherein the first participant is associated with a first conference client device and the second participant is associated with a second conference client device, and determine that the first participant is performing screen sharing. The processor may be further configured identify a first item of content in the video stream to shield from being viewable during rendering of the video stream, obfuscate the identified first item of content in the video stream, and provide the video stream showing the obfuscated first item of content to the second conference client device to be rendered for display on a display device of the second conference client device.

According to another illustrative embodiment provided to illustrate the broader concepts described herein, a method may include receiving from a first conference client device a video stream in a video conference session between at least a first participant and a second participant, wherein the first conference client device is associated with the first participant, and determining that a screen sharing mode is activated at the first conference client device. The method may also include identifying a first item of content in the video stream to shield from being viewable during rendering of the video stream based on a privacy protection policy, obfuscating the identified first item of content in the video stream, and providing the video stream showing the obfuscated first item of content to a second conference client device, wherein the second conference client device is associated with the second participant.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
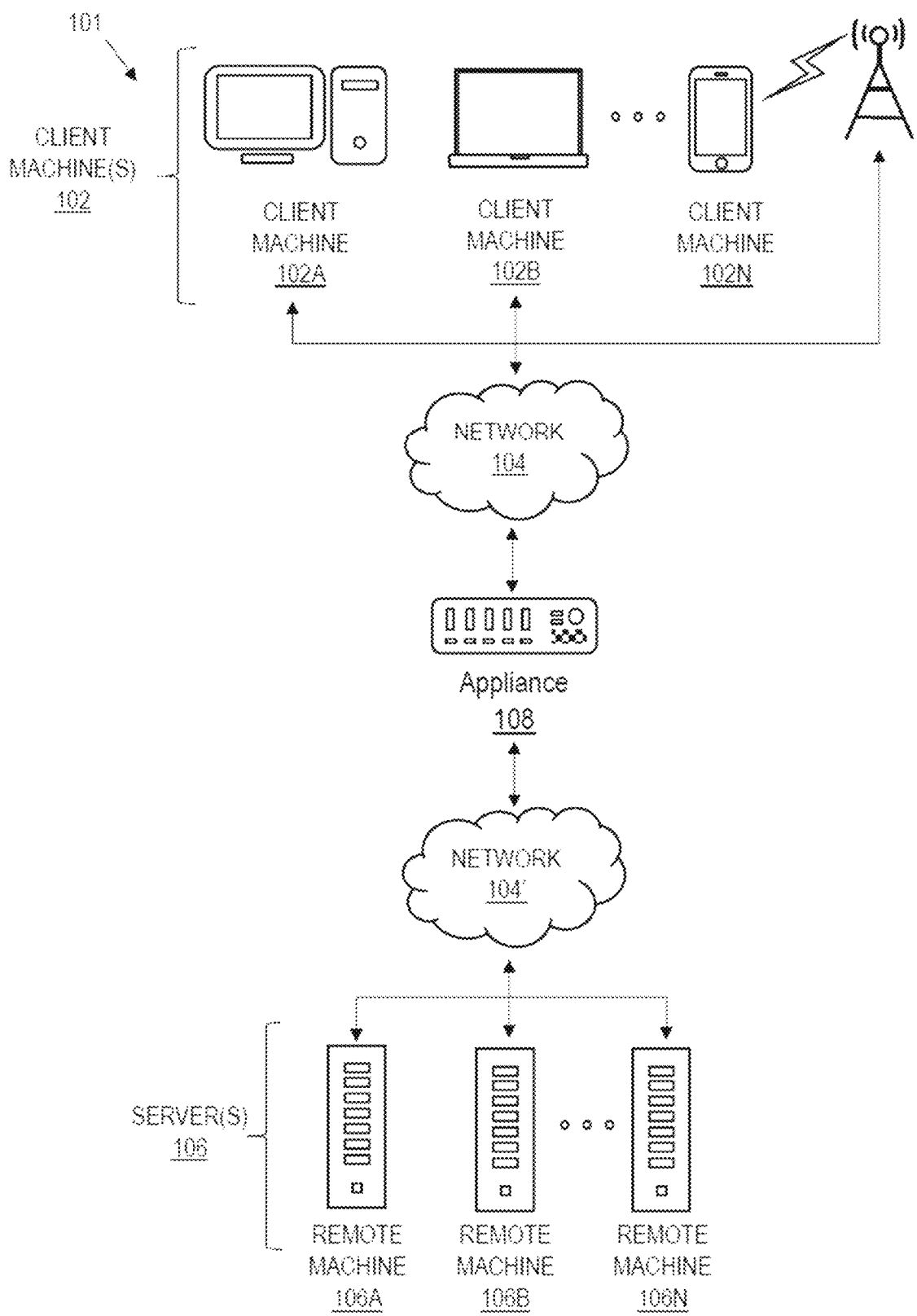
FIG. 1 is a diagram of an illustrative network computing environment in which embodiments of the present disclosure may be implemented.

Video conferencing often involves the participants logging into a web site hosted by a third-party web server. Sharing of a screen, as happens when a conference participant shares the contents displayed on his or her screen, usually involves the sharing participant uploading the screen contents to the web file server/storage container, which then distributes the screen contents to the computing devices of the other conferencing participants for displaying on the screens of these computing devices. However, when the screen contents are displayed on the screens of the computing devices of the other conferencing participants, there is a risk that such displayed content may be leaked or otherwise compromised. For example, unauthorized persons near the other conferencing participants may be able to view the screen contents, including any sensitive information included in the screen contents, being displayed on the screens of the computing devices.

Concepts, devices, systems, and techniques are disclosed for a video conferencing system that provides protection of sensitive information during screen sharing of content by a presenter in a video conference session. In various implementations, the video conferencing system provides or otherwise facilitates a video conference session between conference participants (also referred to herein more simply as "participants" or "participant" in the singular form). Each participant may be associated with a conference client device. These conference client devices are client computing devices used by the participants to connect to and participate in the video conference session.

In embodiments, the protection of the sensitive information is achieved by a participant specifying or otherwise indicating content which the participant considers sensitive. For example, a participant can configure a privacy protection policy defining content that the participant considers sensitive (interchangeably referred to herein as "sensitive information") and how the sensitive information is to be shielded when performing screen sharing during a video conference session. The conferencing participant can provide its privacy protection policy to the video conferencing system. Then, when the participant performs screen sharing, for example, as a conference presenter, the video conferencing system can analyze a video stream representing the content being shared by the conference presenter who is performing the screen sharing to identify one or more items of sensitive information to obfuscate based on the privacy protection policy. For example, the privacy protection policy may define content that is sensitive and the way the sensitive content is to be obfuscated. The video conferencing system can then obfuscate the identified items of sensitive information and generate a video stream that shows the items of sensitive information in obfuscated form to prevent viewing of the sensitive information when displayed. Forms of obfuscation include, for example, applying an overlay with sufficient distortion effects (e.g., a mosaic or a black-out box), applying a transformation, adding artifacts, and/or redaction. The video conferencing system can then send or otherwise provide the video stream showing the obfuscated items of sensitive information to the conference client devices of the other participants in the video conference session to be rendered on the screens of these conference client devices. These and other advantages, variations, and embodiments will be apparent in light of this disclosure.

As used herein, the term "sensitive information" or "sensitive content" includes any information or content that is identified by an individual/organization as being only intended to be seen/viewed by the user themselves, or intended to be seen/viewed by any one or more other persons authorized by this user. Other terms may also be used to refer to information or content that is either legally confidential/sensitive or identified by an individual/organization as being only for the eyes of the user themselves, or any one or more other persons authorized by this user. In the various embodiments of the concepts, devices, systems, and techniques disclosed herein, sensitive information includes any information or content that is indicated in a privacy protection policy.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N.

Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
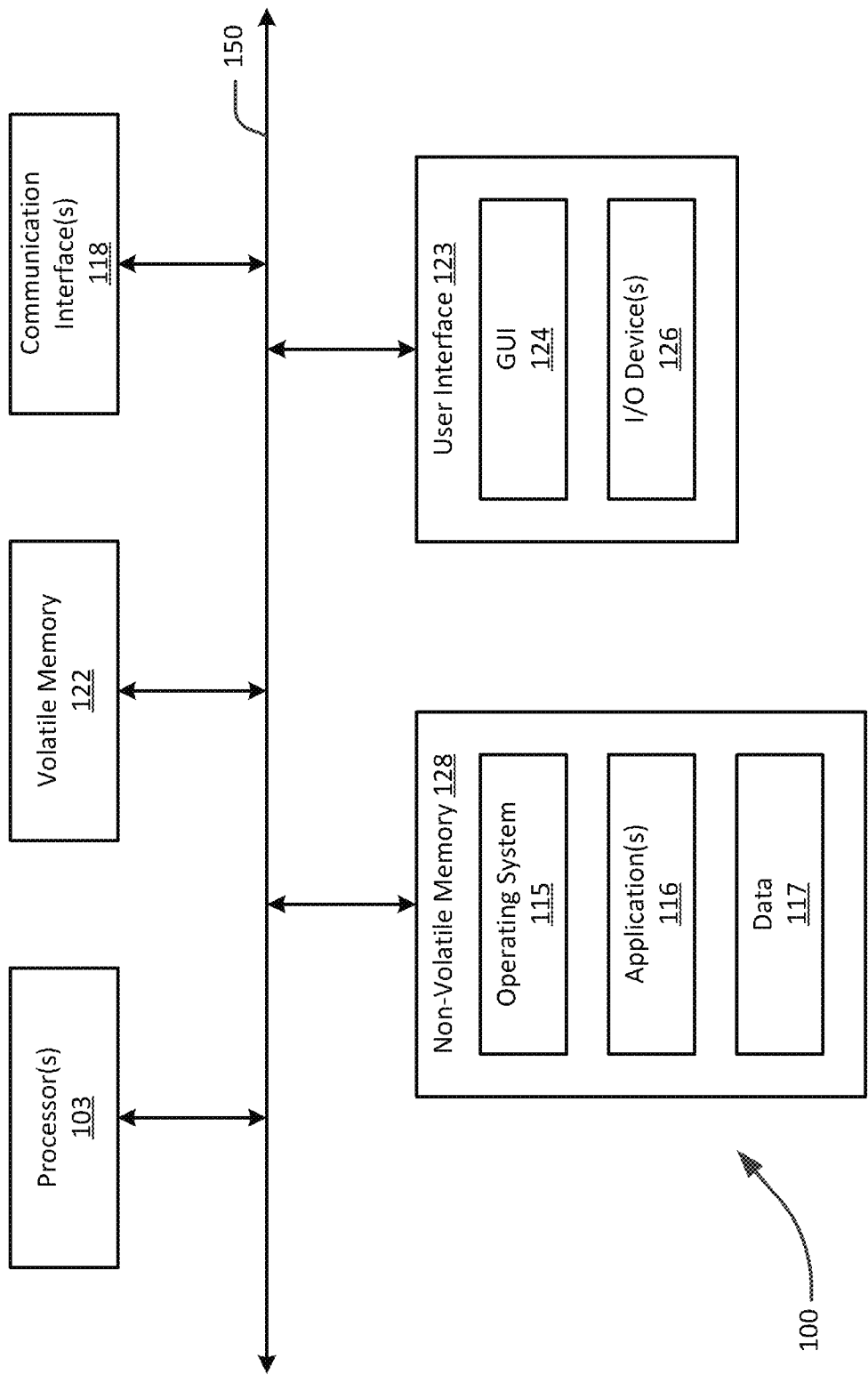
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
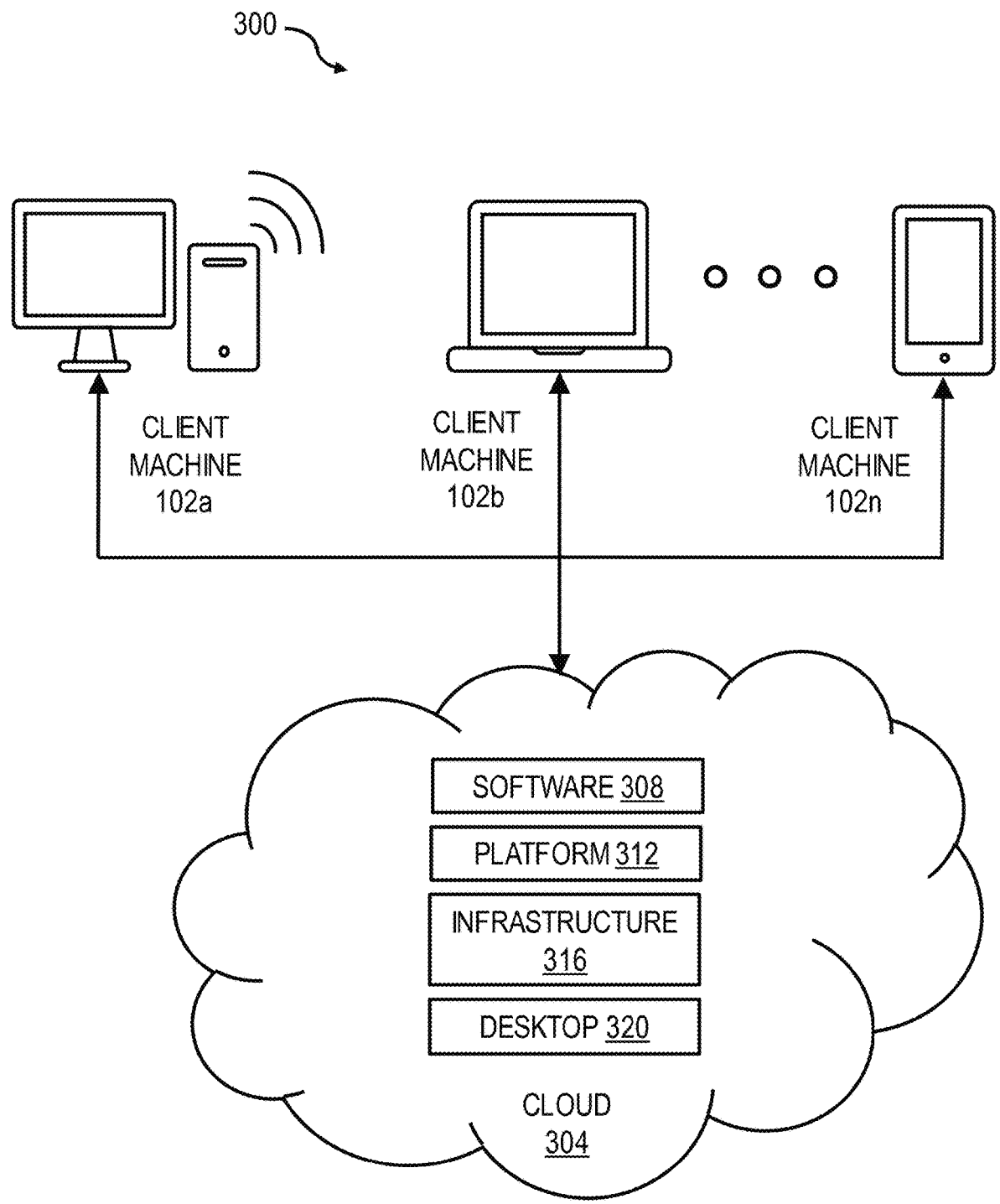
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
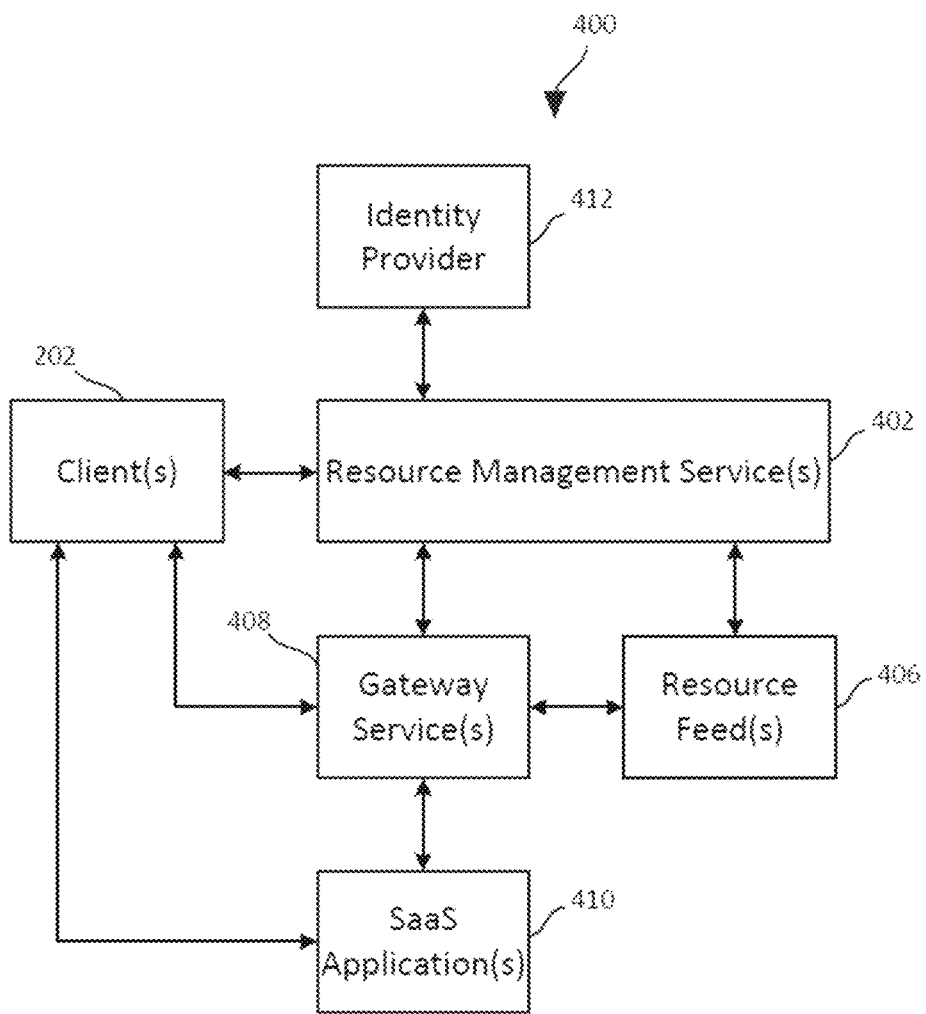
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
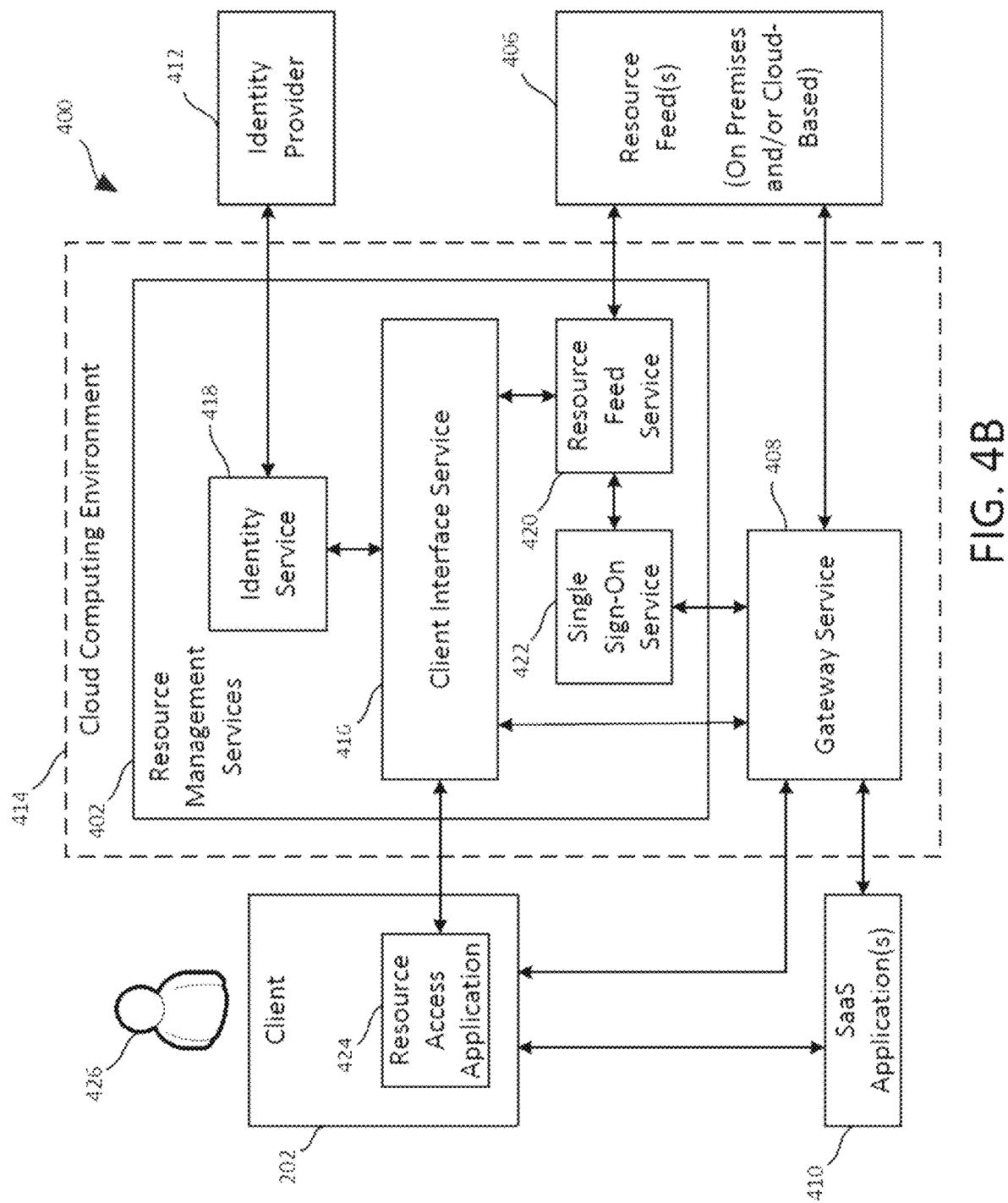
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
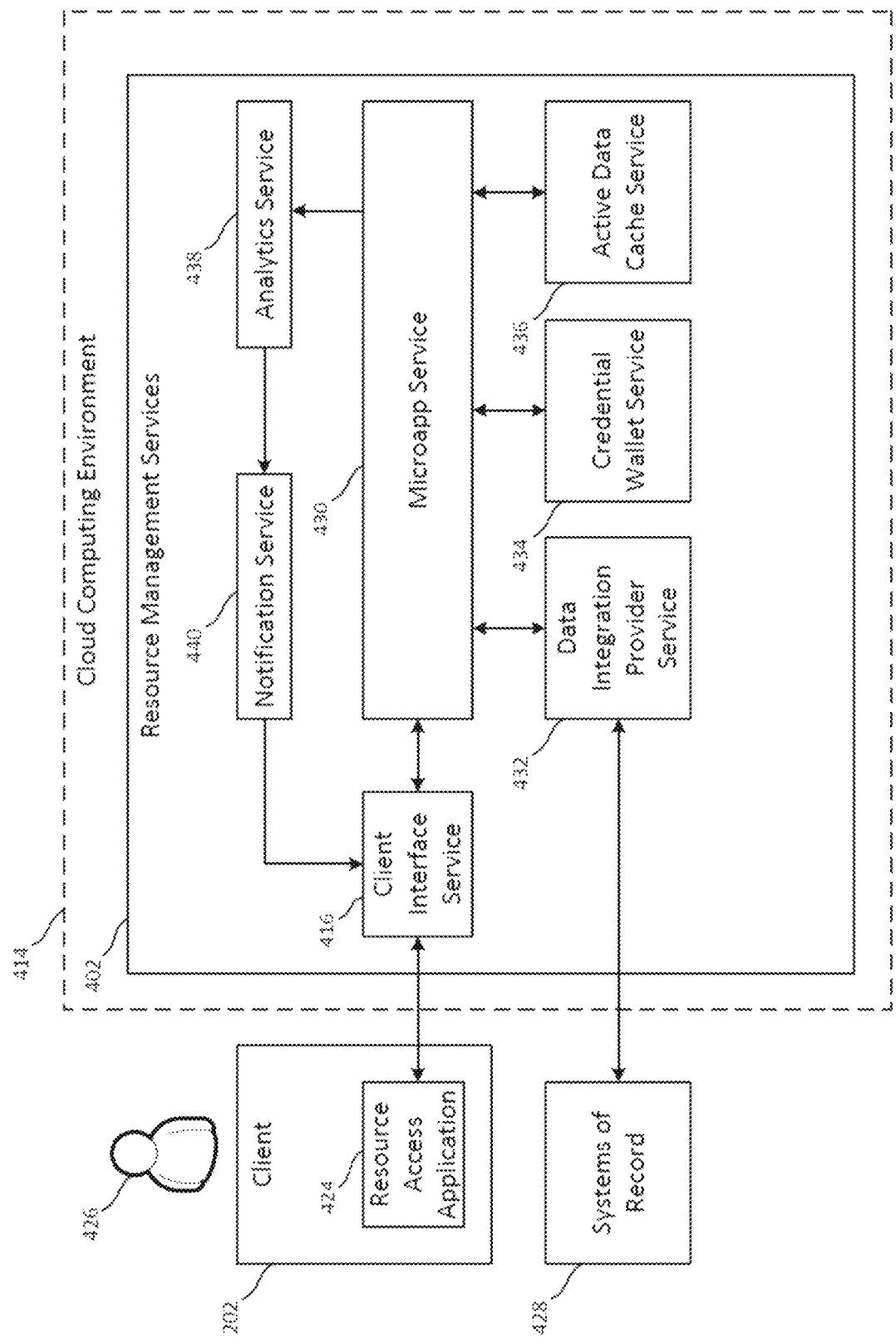
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
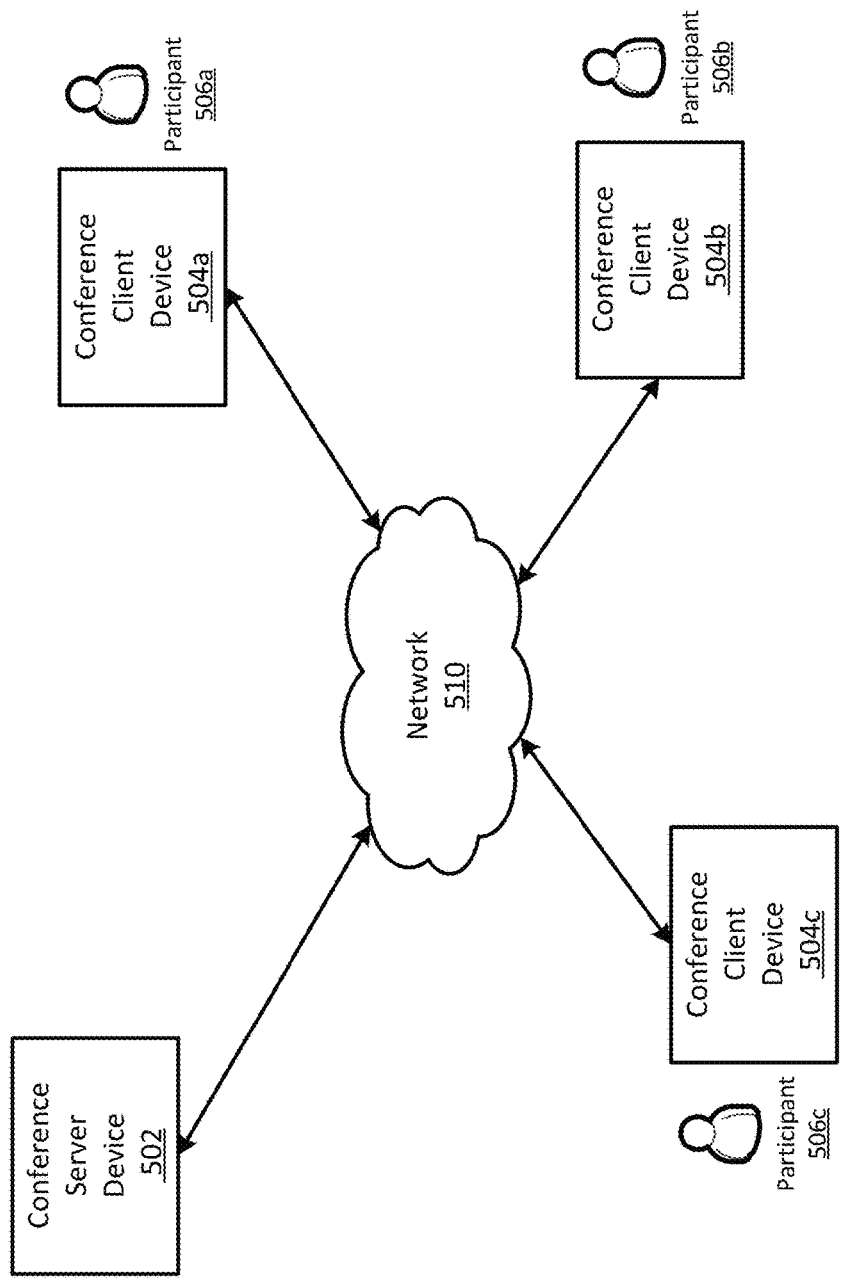
FIG. 5 is a block diagram of an example conference system that can be used to provide privacy protection for video conference screen sharing, in accordance with an embodiment of the present disclosure.

FIG. 5 is a block diagram of an example conference system 500 that can be used to provide privacy protection for video conference screen sharing, in accordance with an embodiment of the present disclosure. As shown, in some implementations, conference system 500 includes a conference server device 502 communicatively coupled to conference client devices 504*a*-504*c* (individually referred to herein as conference client device 504 or collectively referred to herein as conference client devices 504) via a network 510. Network 510 can be a local area network, a wide area network, the Internet, and/or other wired or wireless networks. For example, in some implementations, network 510 may correspond to network 104 described previously.

The number of conference client devices 504 depicted in conference system 500 is for illustration, and those skilled in the art will appreciate that there may be a different number of conference client devices 504, including very large numbers of conference client devices 504 (e.g., tens, hundreds, or thousands of such conference client devices 504). Also, in other implementations, conference system 500 may not have all of the elements shown in FIG. 5 and/or may have other elements including other types of elements instead of, or in addition to, some or all of the elements shown in FIG. 5. For example, conference system 500 may include more than one conference server device 502.

Still referring to conference system 500 of FIG. 5, conference participants 506*a*-506*c* (individually referred to herein as conference participant 506 or collectively referred to herein as conference participants 506) may communicate with each other using respective conference client devices 504*a*-504*c*. For example, conference participants 506 may use their respective conference client devices 504 to interact with each other during a video conference session, where respective conference client devices 504, operating or otherwise functioning as conference client devices, transmit or otherwise provide media streams to each other.

With continued reference to FIG. 5, conference server device 502 enables video conferencing to occur between conference participants 506. In some implementations, conference server device 502 receives media streams from the conference client devices, processes the received media streams, and retransmits the processed media streams to appropriate conference client devices via network 510. It may thus be said that conference server device 502 links together the conference endpoints (i.e., by transmitting media streams between conference endpoints via network 510) and thus enables video conferencing to occur between conference participants 506.

The media streams may include different types of media streams (e.g., video streams, audio streams, text, audio, images, animations, video, and interactive content). Such media streams may include, for example, video streams that show conference participants 506 (e.g., faces of the conference participants) and/or may include audio streams which may or may not be associated with the video streams. Note that the media streams may include media streams being transmitted in different directions (e.g., one or more outbound video and/or audio streams from a conference client device and/or one or more inbound video and/or audio streams to a conference client device) relative to each conference client device.

In one example scenario, one of the participants (e.g., conference participant 506*a*) at one of the conference client devices (e.g., conference client device 504*a*) who has joined or is joining (or is participating in) an ongoing video conference session may want to interact with one or more of the other participants (e.g., conference participants 506*b*, 506*c*) who has joined (or is participating in) the video conference session. For example, conference participant 506*a* may want to interact as a conference presenter and activate a screen share feature of conference server device 502. A screen share feature is a feature where a participant (referred to as a sharing participant, for example, a conference presenter) displays his or her screen (e.g., content being displayed on his or her screen, or a selected portion or portions of the screen) in the video stream such that other participants in the video conference session can see content the sharing participant has displayed on a screen of his or her display (i.e., the sharing participant's screen is made available (or "shared") for other participants to view the content thereon). For instance, the content being shared by the sharing participant may be displayed on the screens of the conference client devices of the other participants in the video conference session.

Continuing the example scenario, conference participant 506*a* can configure a privacy protection policy defining content that conference participant 506*a* considers to be sensitive information and how the sensitive information is to be shielded when performing screen sharing by the participant. Prior to activating the screen share feature or after the screen share feature is commenced, the conference client device being used by conference participant 506*a* can transmit or otherwise provide the privacy protection policy of conference participant 506*a* to conference server device 502. Conference server device 502 can then process the video stream showing the content being displayed on the screen of the conference client device of conference participant 506*a* to identify items of sensitive information included in the content based on the privacy protection policy. Conference server device 502 can obfuscate the identified items in the video stream according to the privacy protection policy. For example, in the case where the privacy protection policy indicates that the identified items of sensitive information is to be obfuscated by applying a mosaic over the items of sensitive information, conference server device 502 can generate a video stream showing the identified items of sensitive information having a mosaic applied over the identified items of sensitive information. Conference server device 502 can then transmit the processed video stream showing the identified items of sensitive information in obfuscated form (i.e., a mosaic applied over the items of sensitive information) to the conference client devices of conference participants 506*b*, 506*c* for rendering of the video stream on the screens of these conference client devices.

Figure 6:
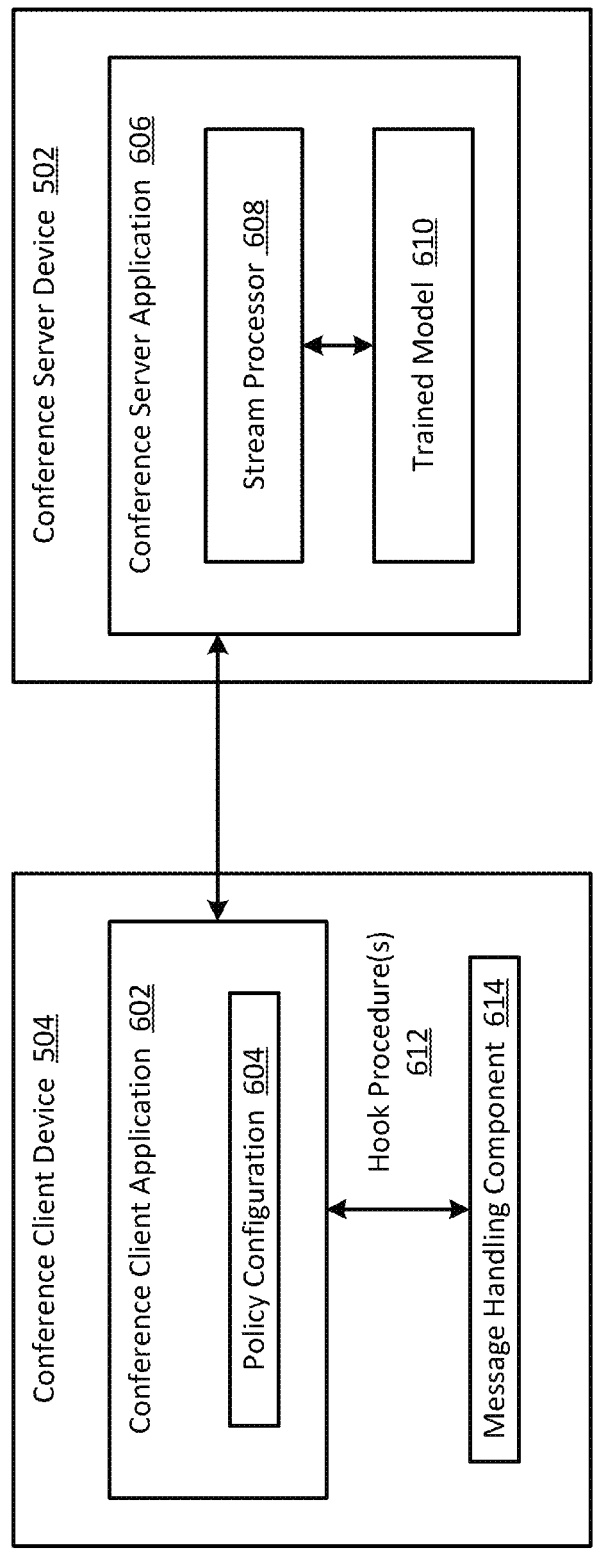
FIG. 6 is a block diagram showing interaction between a conference client device and a conference server device to provide privacy protection for video conference screen sharing, in accordance with an embodiment of the present disclosure.

FIG. 6 is a block diagram showing interaction between conference client device 504 and conference server device 502 to provide privacy protection for video conference screen sharing, in accordance with an embodiment of the present disclosure. As shown, conference client device 504 includes a conference client application 602, which further includes a policy configuration 604. Conference server device 502 includes a conference server application 606, which further includes a stream processor 608 and a trained model 610.

Conference client application 602 is configured to execute on conference client device 504 and to access and utilize the services and functionality made available by conference server device 502. For example, conference client application 606 may access the video conferencing services provided by conference server application 606 executing on conference server device 502 to operate as a conference client device of a conference participant as variously described herein.

In some implementations, conference client application 602 may be a conferencing client application, such as a Zoom client, a GoToMeeting client, or a Webex client, to name three examples. Conference client application 602 enables conference client device 504 to join a video conference session as a conference endpoint. Conference client application 602 may be configured to present text, audio, and/or video from the video conference session on conference client device 504, and to transmit media and/or information from conference client device 504 to conference server application 606 hosting the video conference session or other conference client devices. For example, conference client application 602 may render the video stream of the video conference session on a screen of conference client device 504.

In some embodiments, conference client application 602 may provide a user interface to enable a user, such as the participant, to configure policy configuration 604. Policy configuration 604 defines the participant's privacy protection policy. As described previously, the participant's privacy protection policy indicates content that the participant considers sensitive (referred to herein as "sensitive information") and how the sensitive information is to be shielded when performing screen sharing by the participant. For example, policy configuration 604 may indicate that a notification, an alert, or other similar content generated by a particular application (e.g., a Slack new message pop-up box or an Outlook new e-mail pop-up box) and appearing on the screen is to be shielded during screen sharing. As another example, policy configuration 604 may indicate that the contents appearing in a favorite bar at the top of an application window, such as a browser window, and the contents of a folder appearing in a specific region of the screen is to be shielded during screen sharing. In some implementations, policy configuration 604 may indicate different forms of obfuscation to shield the indicated sensitive information. Continuing the example above, policy configuration 604 may indicate that the message pop-up box appearing on the screen is to be obfuscated by applying a mosaic over the message pop-up box, that the contents of a favorite bar at the top of an application window is to be obfuscated by applying a mosaic over the favorite bar, and that the folder contents appearing in a specific region of the screen is to be obfuscated by applying a block-out box over the folder contents. An example of such a user interface is described below in conjunction with FIG. 7.

In some implementations, and as can be seen in FIG. 6, conference client application 602 may configure one or more hook procedure(s) 612 to intercept particular types of events, such as function calls and messages, to a message handling component 614 of the underlying operating system (OS) of conference client device 504. In such implementations, conference client application 602 may configure appropriate hook procedure(s) 612 based on information from the privacy protection policy configured by the conference participant using conference client application 602. For example, the participant may have specified in the privacy protection policy that new message notifications generated by a Slack client or an Outlook client is sensitive information. In this example case, conference client application 602 can configure hook procedures 612 to monitor and/or intercept specific event messages (e.g., a new message pop-up box) sent from client applications (e.g., Slack client, Outlook client, etc.) running on conference client device 504 to message handling component 614 to display notifications, alerts, or other similar content on a screen of conference client device 504. Once such a call is intercepted, conference client application 602 can determine whether screen sharing is being performed by conference client device 504. If screen sharing is being performed by conference client device 504, conference client application 602 can send auxiliary information pertaining to the intercepted call to conference server application 606. For example, in an implementation, conference client application 602 can send the auxiliary information with the video stream that is being sent to conference server application 606. As will be further described below, conference server application 606 can use the auxiliary information to identify items of content in the video stream to obfuscate.

For example and in more detail, client applications, such as a Slack client and an Outlook client, to provide two examples, may be executing on conference client device 504. Such client applications can display a notification, an alert, or other similar content on a user display screen (e.g., cause an instance of a notification pop-up box to be displayed on the screen) using one or more function calls to message handling component 614 and specifying values for parameters such as, for example, creator of the notification, look and feel of the notification (e.g., pop-up box, toast, notification bubble, etc.), notification contents (i.e., notification message), location and size of the notification, and a display duration (i.e., duration of time the notification is to be displayed). In such cases, a hook procedure can be defined to intercept an event message made by a Slack client executing on conference client device 504 to generate a new notification. Another hook procedure can be defined to intercept an event message made by an Outlook client executing on conference client device 504 to generate a new notification. In the example case above, if a defined hook procedure 612 intercepts an event message made by the Slack client, a determination can be made as to whether screen sharing is being performed by conference client device 504. If screen sharing is being performed by conference client device 504, conference client application 602 can send auxiliary information pertaining to the intercepted event message (e.g., name of the client application generating a notification, location and size of the notification on the screen, the duration of time the notification is to be displayed, etc.) to conference server application 606. Conference client application 602 can send the auxiliary information with the video stream that is being sent to conference server application 606.

Still referring to FIG. 6, conference server application 606 is configured to execute on conference server device 502 and host video conference sessions. For example, conference server application 606 may enable exchange of media streams in real-time between one or more conference client devices of participants participating in a video conference session. In such implementations, conference server application 606 may facilitate operations to enable participants to provide their privacy protection policies, obfuscate the items of sensitive information shown in the video streams as specified in the provided privacy protection policies, and transmit the processed video stream showing the identified items of sensitive information in obfuscated form to the appropriate conference client devices.

In some embodiments, conference server application 606 is also configured to receive from the conference client devices auxiliary information with the video stream. As described previously, the auxiliary information provided by a conference client device pertains to event messages made by client applications executing on the conference client device to generate notifications, alerts, or other similar content on a screen of the conference client device. In particular, the auxiliary information pertains to content that is being shown in the video stream associated with the auxiliary information. For example, the auxiliary information may indicate when and where in the video stream a notification is to occur. Conference server application 606 can provide or otherwise make available the received auxiliary information to stream processor 608 for use in processing the video stream.

Stream processor 608 is configured to perform further processing of the received video streams. This processing may include, for example, processing of elements recognized in the video frames by trained model 610 to determine whether the recognized elements should be shielded, identifying the location of such elements in the video frames, and obfuscating the elements (e.g., the area of the video frames at which the elements appear) according to a privacy protection policy. For example, in an implementation, stream processor 608 can use the output from or information provided by trained model 610 to perform image editing to apply special effects, which may include various forms of distortion, artistic effects, geometric transforms, texture effects, and combinations thereof, at the appropriate locations in the video frame to obfuscate the appropriate elements (items of sensitive information).

In embodiments where auxiliary information is provided, stream processor 608 is configured to perform further processing of the received video streams to identify content in the video frames that should be shielded and obfuscate the identified content in the video frames based on the auxiliary information and the privacy protection policies. For example, suppose a privacy protection policy associated with a conference client device indicates that a Slack message pop-up box appearing on a screen of the conference client device is sensitive information and that the Slack message pop-up box is to be obfuscated by applying a mosaic over the Slack message pop-up box. In this case, if the auxiliary information indicates that the video stream showing the screen of the conference client device includes a Slack message pop-up box, stream processor 608 can determine that the Slack message pop-up box shown in a video frame is sensitive information based on the privacy protection policy. Having determined that the Slack message pop-up box shown in the video frame is content that is sensitive to the sharing participant, stream processor 608 can obfuscate the Slack message pop-up box according to the privacy protection policy. In this example case, stream processor 608 can apply a mosaic over the Slack message pop-up box in the video frame as specified by the privacy protection policy. As explained above, the auxiliary information may include the location and size of the Slack message pop-up box on the screen and the duration of time the Slack message pop-up box is to be displayed. Stream processor 608 can determine the area of the video frame at which the Slack message pop-up box appears and at which the mosaic is to be applied based on the location and size auxiliary information. Also, stream processor 608 can continue to apply the mosaic to the area in successive video frames of the video stream based on the duration of time auxiliary information. Stream processor 608 can stop applying the mosaic after the indicated duration of time has elapsed.

Trained model 610 is configured to recognize what is being shown and whether any sensitive information is present or otherwise contained in a video frame. In some implementations, computing device 802 may include a machine learning model trained to recognize (or predict) what is being shown in a video frame. For example, the trained machine learning model may recognize that a video frame is showing a graphical user interface or viewing tool, such as a browser window, or a file folder, to provide two examples. The trained machine learning model may also recognize various elements shown in a video frame and the locations of such elements in the video frame. For example, if the trained machine learning model recognizes that a video frame is showing a browser window, the trained machine learning model may recognize various elements of the browser window, such as a favorite bar, side bar, display window, and address bar, to name a few examples. In the example case of a file folder, the trained machine learning model may recognize the files and other contents of the file folder.

The concept of image recognition with machine learning is well understood in the fields of pattern recognition, machine learning, and convolutional neural networks and will not be discussed in detail here. However, for purposes of this discussion, it is sufficient to understand that trained model 610 may operate to recognize that a video frame is showing a graphical user interface or viewing tool as well as various elements included in the recognized graphical user interface or viewing tool.

Figure 7:
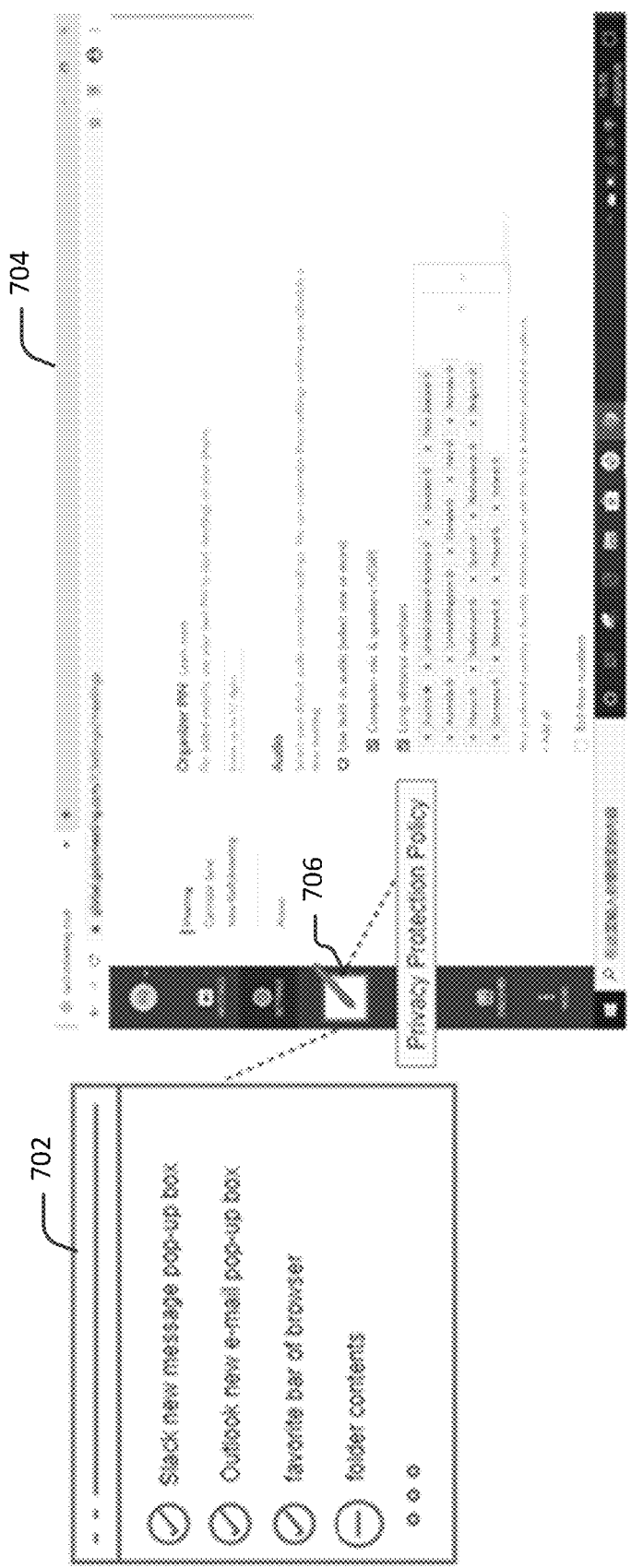
FIG. 7 is a diagram of an example privacy protection policy checkbox of a conference client application user interface, in accordance with an embodiment of the present disclosure.

FIG. 7 is a diagram of an example privacy protection policy checkbox 702 of a conference client application user interface 704, in accordance with an embodiment of the present disclosure. User interface 704 may be a main window provided by a conference client application, such as conference client application 602. To this end, user interface 704 may display information regarding a registered user, the available conferencing services, and control elements, sometimes referred to as widgets, that facilitate interaction with the conference client application. As shown in FIG. 7, the displayed control elements may include a control element 706 that, when selected or otherwise activated using a cursor or a suitable pointing device, causes the display of privacy protection policy checkbox 702. Privacy protection policy checkbox 702 can be used by the registered user to configure a policy configuration (the registered user's privacy protection policy).

In the example depicted in FIG. 7, privacy protection policy checkbox 702 includes checkboxes for enabling the options to select "Slack new message pop-up box", "Outlook new e-mail pop-up box", "favorite bar of browser", and "folder contents" as sensitive information. As shown, the checkboxes for "Slack new message pop-up box", "Outlook new e-mail pop-up box", and "favorite bar of browser" are clicked, for example, using a suitable pointing device, to enable the options. Accordingly, Slack new message pop-up box, Outlook new e-mail pop-up box, and favorite bar of browser selected to be sensitive information and indicated as such in a privacy protection policy of the registered user. In contrast, since the checkbox for "folder contents" is not clicked, folder contents is not selected to be sensitive information.

In some embodiments, enabling an option in privacy protection policy checkbox 702 may cause a display of a list box or other suitable input control element listing the forms of obfuscation (e.g., apply a mosaic, apply a black-out box, apply a transformation, add artifacts, and redact) that can be applied to shield the sensitive information. The displayed list box can then be used to select one of the available forms of obfuscation to apply to the sensitive information. Privacy protection policy checkbox 702 may also include a control element, such as the ellipses or a slider (not shown) which can be used to adjust the checkboxes displayed in privacy protection policy checkbox 702 (e.g., display additional checkboxes for enabling the options to select other types of content as sensitive information).

Figure 8:
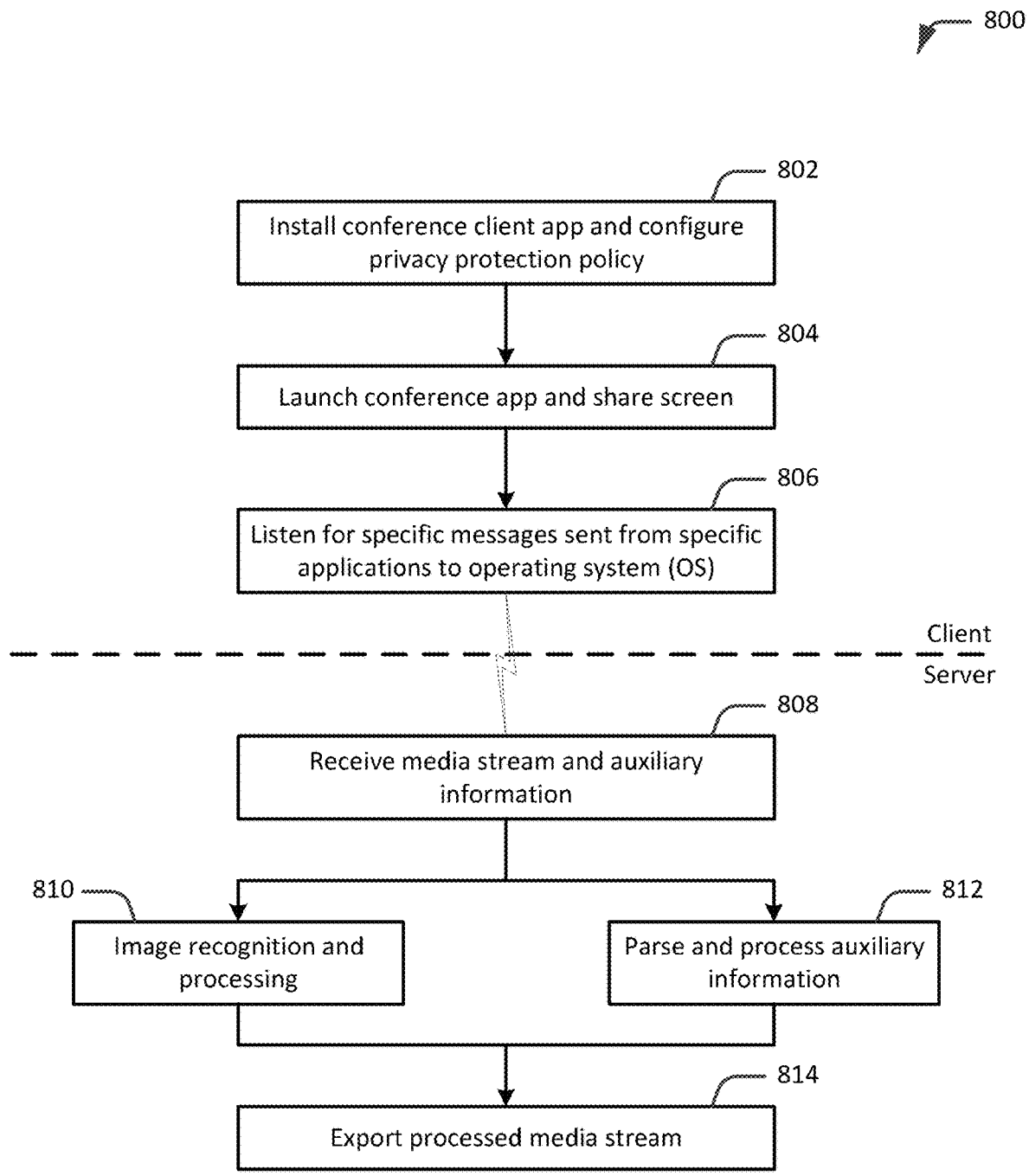
FIG. 8 is a flow diagram of an example process for providing privacy protection for video conference screen sharing, in accordance with an embodiment of the present disclosure.

FIG. 8 is a flow diagram of an example process 800 for providing privacy protection for video conference screen sharing, in accordance with an embodiment of the present disclosure. Example process 600 may be implemented or used within a computing environment or system such as those disclosed above at least with respect to FIG. 1, FIG. 2, FIG. 3, FIGS. 4A-4C and/or FIG. 5. For example, in some embodiments, the operations, functions, or actions illustrated in example process 600 may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3, clients 202 of FIGS. 4A-4C, and/or devices 502, 504 of FIG. 5). For example, the operations, functions, or actions described in the respective blocks of example process 600 may be implemented by applications 116 and/or data 117 of computing device 100.

With reference to FIG. 8, process 800 is initiated at 802 where a user (e.g., user 426 of FIG. 4B or participant 506 of FIG. 5) installs a conference client application (e.g., conference client application 602) on a computing device. The user can then use the installed conference client application to participate in a conferencing session, such as a video conferencing session, with one or more other participants. As part of or subsequent to installing the conference client application, the user may configure a privacy protection policy. The configured privacy protection policy defines the content that the user considers to be sensitive (i.e., sensitive information) and how the content is to be shielded when performing screen sharing during a video conference session.

At 804, the user launches the conference client application on his or her computing device and joins a video conference session. The conference client application executing on the computing device can start sending media streams to a conference server application (e.g., conference server application 606) that is hosting the video conference session. In an implementation, the conference client application instance can send or otherwise provide the user's privacy protection policy to the conference server application. During the video conference session, the user can use the conference client application instance to perform screen sharing.

At 806, the conference client application executing on the user's computing device configures one or more hooks procedures to intercept calls made by specific application instances to the underlying operating system (OS) based on the user's privacy protection policy. For example, if the privacy protection policy configured by the user indicates that an Outlook new e-mail pop-up box is sensitive information that should be shielded during screen sharing, the conference client application instance can configure a hook procedure to intercept calls made by an Outlook client instance to the underlying OS to display a new e-mail pop-up box. The conference client application instance can then send auxiliary information pertaining to intercepted calls made by the Outlook client instance to display new e-mail pop-up boxes.

At 808, the conference server application hosting the video conference session receives the media stream and auxiliary information sent by the conference client application executing on the user's computing device. In an implementation, the auxiliary information may be received with a video stream sent by the conference client application instance on the user's computing device.

At 810, the conference server application hosting the video conference session processes the received media stream to identify items of sensitive information that should be shielded during the screen sharing based on the user's privacy protection policy. In an implementation, the conference server application can utilize a trained machine learning model (e.g., trained model 610) to recognize elements that are being shown in the video stream. The conference server application can then determine whether the elements should be shielded during screen sharing and obfuscate such elements in the video frames of the media stream based on the user's privacy protection policy.

At 812, the conference server application hosting the video conference session processes the auxiliary information that may have been sent by the conference client application executing on the user's computing device. In particular, the conference server application further processes the video frames of the media stream to identify content in the video frames that should be shielded during screen sharing based on the received auxiliary information and the user's privacy protection policy. The conference server application can then obfuscate the identified content in the video frames of the media stream based on the user's privacy protection policy. Note that the operations performed at 812 are optional in the sense that the operations are performed in cases where auxiliary information is provided by the conference client application instance on the user's computing device.

At 814, the conference server application hosting the video conference session exports (sends or otherwise provides) the processed media stream, including the processed video stream showing the obfuscated items of sensitive information, the conference client devices of the other participants in the video conference session.

Figure 9:
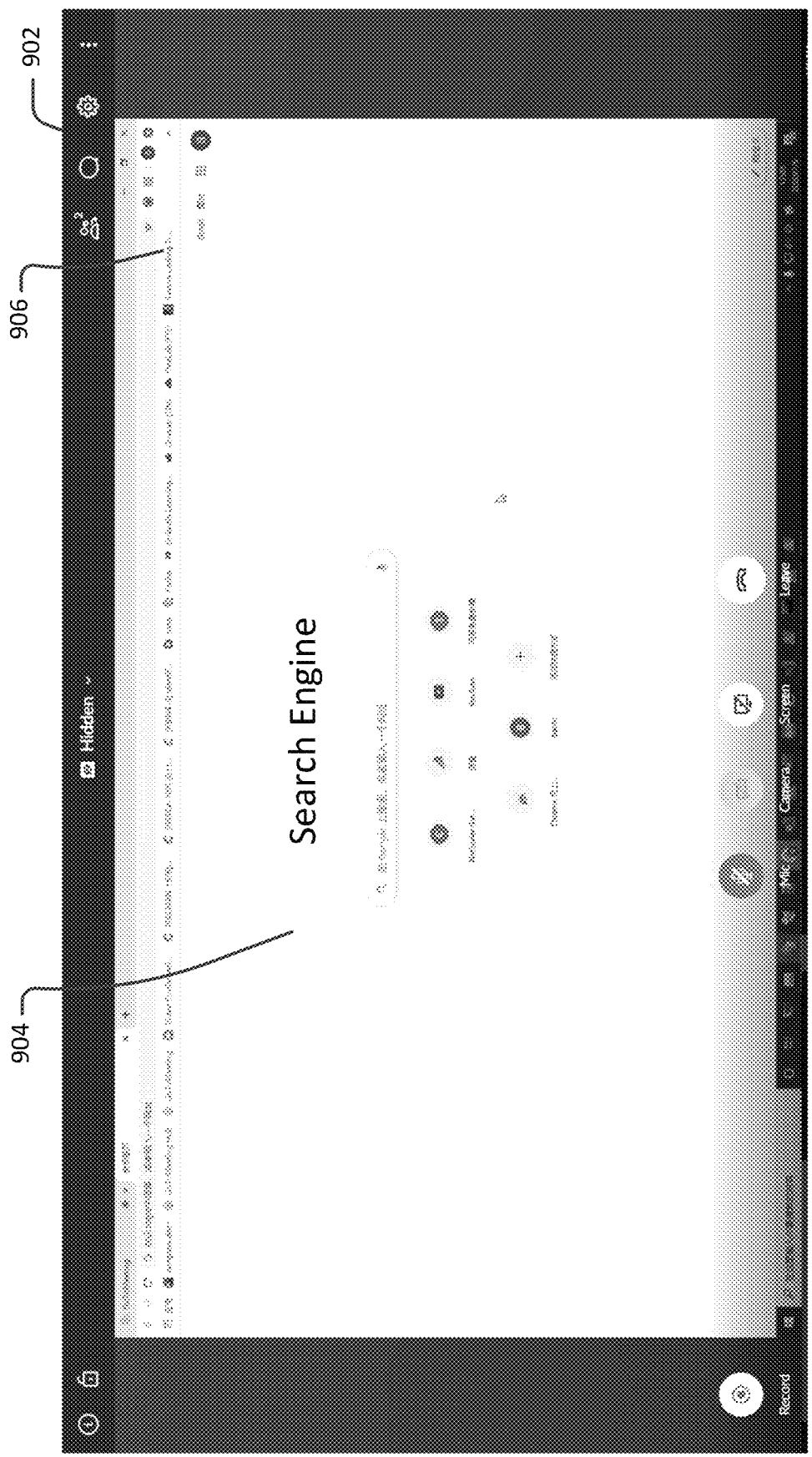
FIG. 9 is a screenshot illustrating an example image of a conference client application window displayed on a screen of a conference client device of a conference presenter, in accordance with an embodiment of the present disclosure.

FIG. 9 is a screenshot illustrating an example image of a conference client application window 902 displayed on a screen of a conference client device of a conference presenter, in accordance with an embodiment of the present disclosure. For example, the conference presenter may be participating in a video conference session and performing screen sharing to share content being displayed on his or her screen with the other participants in the video conference session. Prior to performing the screen sharing, the conference presenter may have configured a privacy protection policy indicating that information included in a search engine window favorite bar is sensitive information and that a mosaic is to be applied over the information included in the favorite bar during screen sharing.

Conference client application window 902 shows a search engine window 904 that includes a favorite bar 906. As a result of screen sharing by the participant, search engine window 904 being shown within conference client application window 902 is being shared with the other participants in the video conference session. Since conference client application window 902 is being displayed on the screen of the conference client device of the conference presenter, as can be seen in FIG. 9, the information in favorite bar 906 is not in obfuscated form (e.g., favorite bar 906 does not show a mosaic applied over the included information).

Figure 10:
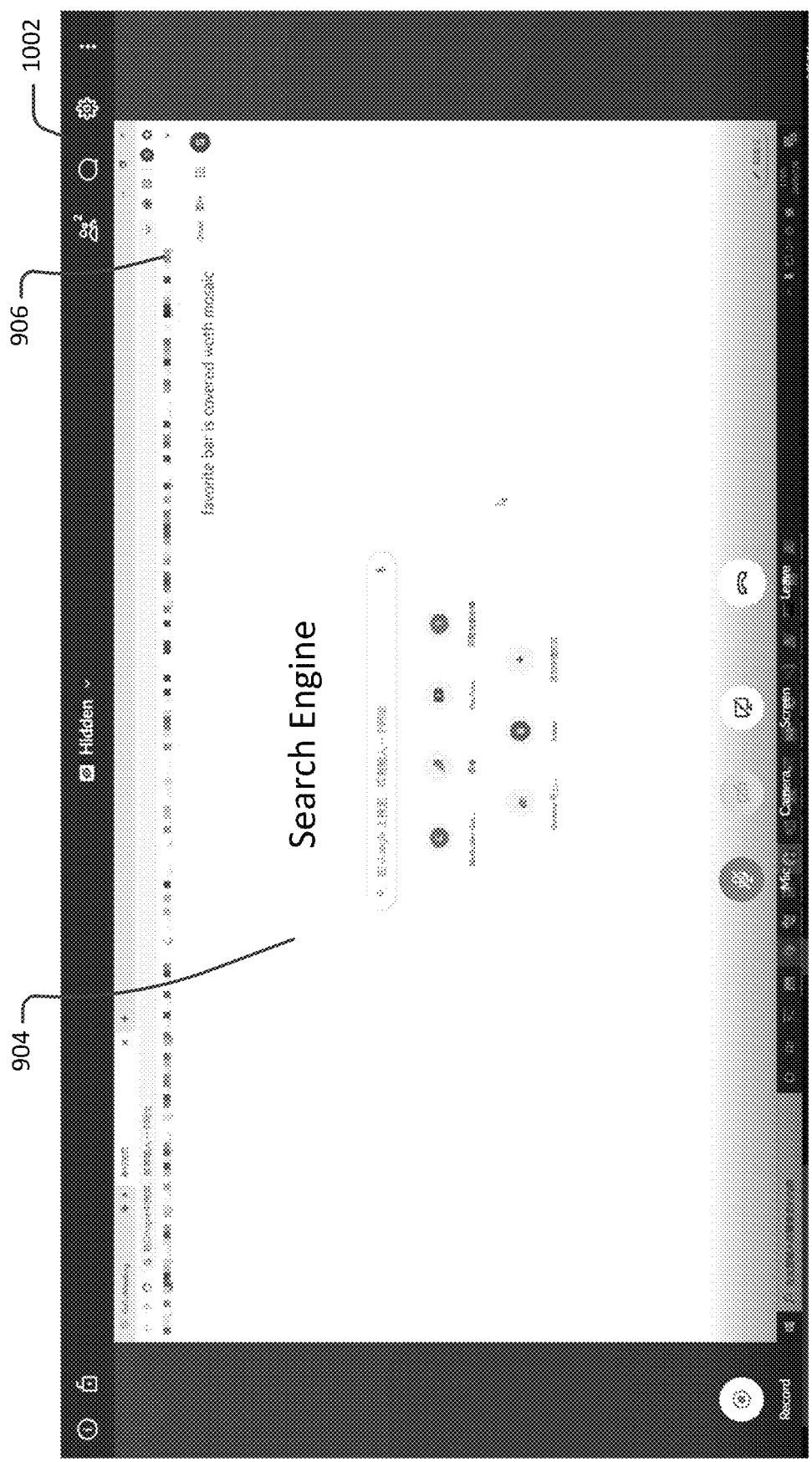
FIG. 10 is a screenshot illustrating an example image of a conference client application window displayed on a screen of a conference client device of a participant, in accordance with an embodiment of the present disclosure.

FIG. 10 is a screenshot illustrating an example image of a conference client application window 1002 displayed on a screen of a conference client device of a participant, in accordance with an embodiment of the present disclosure. For example, the participant may be one of the other participants of the video conference session example of FIG. 9. As such, conference client application window 1002 is showing search engine window 904 that is being shared by the conference presenter. As can be seen in FIG. 10, search engine window 904 shows a mosaic applied over the information in favorite bar 906 to prevent viewing of the information included in favorite bar 906 by the participant. This is because the conference presenter indicated in the privacy protection policy that a mosaic is to be applied over the information included in a search engine window favorite bar during screen sharing. However, as explained above, the conference presenter is able to view the information included in favorite bar 906.

Figure 11:
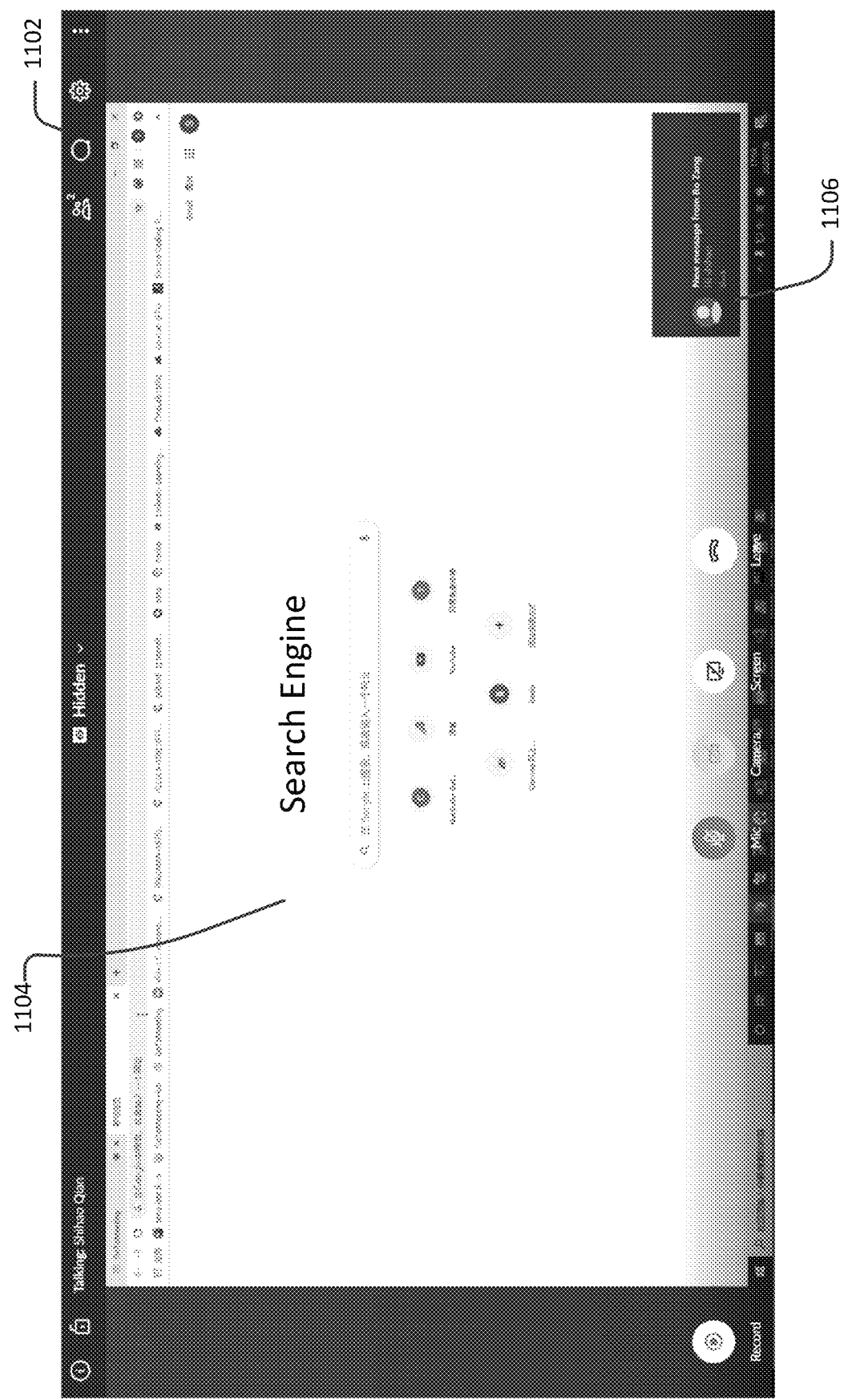
FIG. 11 is a screenshot illustrating an example image of a conference client application window displayed on a screen of a conference client device of a conference presenter, in accordance with an embodiment of the present disclosure.

FIG. 11 is a screenshot illustrating an example image of a conference client application window 1102 displayed on a screen of a conference client device of a conference presenter, in accordance with an embodiment of the present disclosure. For example, the conference presenter may be participating in a video conference session and performing screen sharing to share content being displayed on his or her screen with the other participants in the video conference session. Prior to performing the screen sharing, the conference presenter may have configured a privacy protection policy indicating that information included in a Slack new message pop-up box is sensitive information and that a mosaic is to be applied over the information included in the new message pop-up box during screen sharing.

Conference client application window 1102 shows a search engine window 1104 that includes a Slack new message pop-up box 1106. As a result of screen sharing by the participant, search engine window 1104 being shown within conference client application window 1102 is being shared with the other participants in the video conference session. Since conference client application window 1102 is being displayed on the screen of the conference client device of the conference presenter, as can be seen in FIG. 11, the information in new message pop-up box 1106 is not in obfuscated form (e.g., new message pop-up box 1106 does not show a mosaic applied over the included information).

Figure 12:
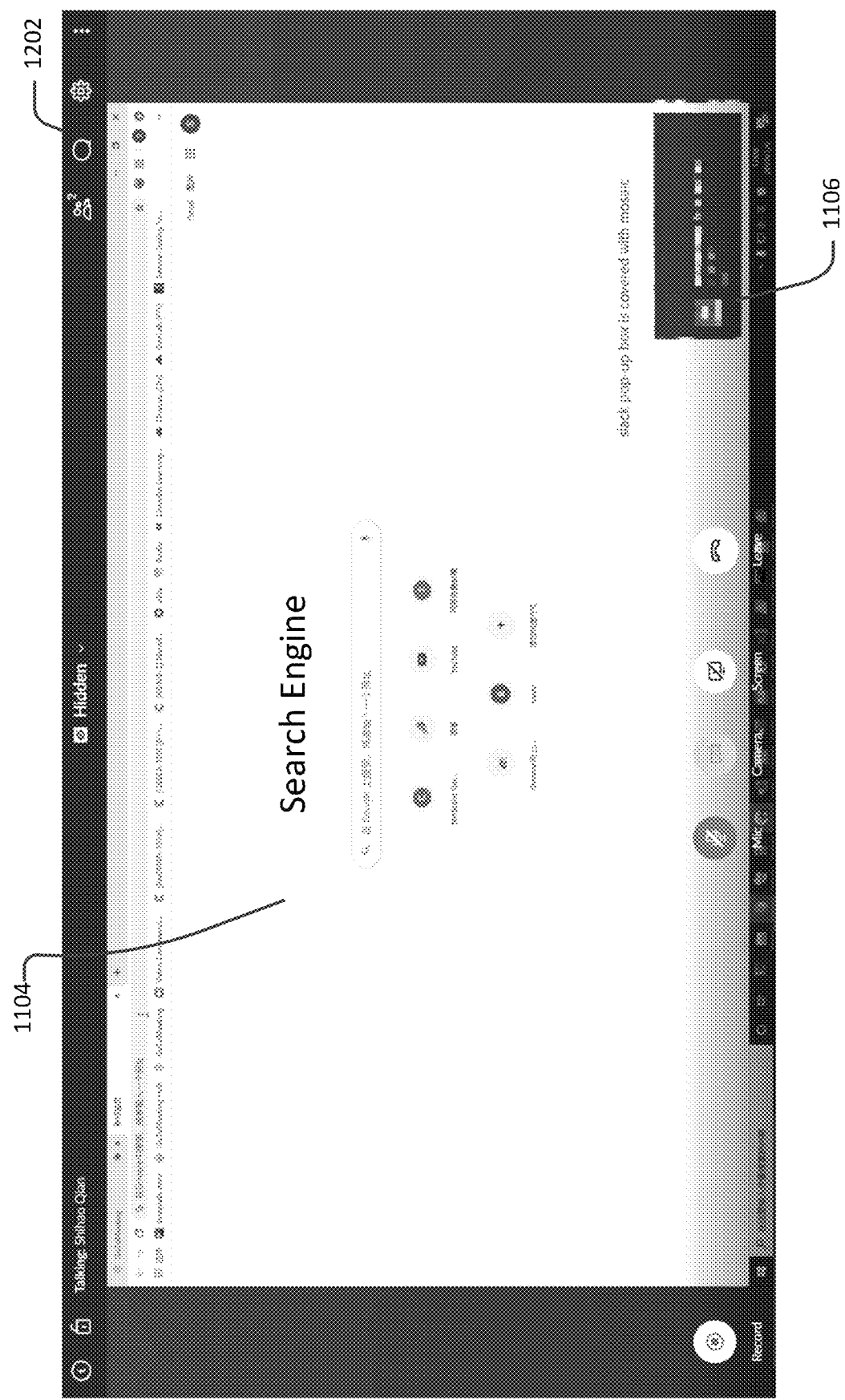
FIG. 12 is a screenshot illustrating an example image of a conference client application window displayed on a screen of a conference client device of a participant, in accordance with an embodiment of the present disclosure.

FIG. 12 is a screenshot illustrating an example image of a conference client application window 1202 displayed on a screen of a conference client device of a participant, in accordance with an embodiment of the present disclosure. For example, the participant may be one of the other participants of the video conference session example of FIG. 11. As such, conference client application window 1202 is showing search engine window 1104 that is being shared by the conference presenter. As can be seen in FIG. 12, search engine window 1104 shows a mosaic applied over the information in new message pop-up box 1106 to prevent viewing of the information included in new message pop-up box 1106 by the participant. This is because the conference presenter indicated in the privacy protection policy that a mosaic is to be applied over the information included in a Slack new message pop-up box during screen sharing. However, as explained above, the conference presenter is able to view the information included in new message pop-up box 1106.

FURTHER EXAMPLE EMBODIMENTS

The following examples pertain to further embodiments, from which numerous permutations and configurations will be apparent.

Example 1 includes a method including: receiving a video stream of a first participant in a video conference session between at least the first participant and a second participant, wherein the first participant is associated with a first conference client device and the second participant is associated with a second conference client device; determining that the first participant is performing screen sharing; identifying a first item of content in the video stream to shield from being viewable during rendering of the video stream; obfuscating the identified first item of content in the video stream; and providing the video stream showing the obfuscated first item of content to the second conference client device to be rendered for display on a display device of the second conference client device.

Example 2 includes the subject matter of Example 1, wherein identifying the first item of content in the video stream to shield is based on a privacy protection policy.

Example 3 includes the subject matter of Example 2, wherein the privacy protection policy is specified by the first participant.

Example 4 includes the subject matter of any of Examples 1 through 3, wherein obfuscating the identified first item of content in the video stream includes processing by a trained machine learning model.

Example 5 includes the subject matter of any of Examples 1 through 4, wherein obfuscating the identified first item of content includes adding a mosaic to the identified first item of content.

Example 6 includes the subject matter of any of Examples 1 through 4, wherein obfuscating the identified first item of content includes one of applying an overlay with distortion effects to the identified first item of content, applying a transformation to the identified first item of content, adding an artifact to the identified first item of content, or redacting the identified first item of content.

Example 7 includes the subject matter of any of Examples 1 through 6, further including: receiving auxiliary information with the video stream; identifying a second item of content in the video stream to shield from being viewable during rendering of the video stream, wherein identifying the second item of content in the video stream is based on the auxiliary information and a privacy protection policy; and obfuscating the identified second item of content in the video stream.

Example 8 includes the subject matter of any of Examples 1 through 6, further comprising receiving auxiliary information with the video stream, the auxiliary information including information associated with an operating system (OS) call on the first conference client device by an application executing on the first conference client device, and wherein identifying the first item of content in the video stream is based on the auxiliary information.

Example 9 includes the subject matter of any of Examples 1 through 6, further comprising receiving auxiliary information with the video stream, the auxiliary information including information regarding a window being generated by an application executing on the first conference client device, and wherein identifying the first item of content in the video stream is based on the auxiliary information.

Example 10 includes a system including a memory and one or more processors in communication with the memory and configured to: receive a video stream of a first participant in a video conference session between at least the first participant and a second participant, wherein the first participant is associated with a first conference client device and the second participant is associated with a second conference client device; determine that the first participant is performing screen sharing; identify a first item of content in the video stream to shield from being viewable during rendering of the video stream; obfuscate the identified first item of content in the video stream; and provide the video stream showing the obfuscated first item of content to the second conference client device to be rendered for display on a display device of the second conference client device.

Example 11 includes the subject matter of Example 10, wherein to identify the first item of content in the video stream to shield is based on a privacy protection policy.

Example 12 includes the subject matter of Example 11, wherein the privacy protection policy is specified by the first participant.

Example 13 includes the subject matter of any of Examples 10 through 12, wherein to obfuscate the identified first item of content in the video stream includes use of a trained machine learning model.

Example 14 includes the subject matter of any of Examples 10 through 13, wherein to obfuscate the identified first item of content includes to add a mosaic to the identified first item of content.

Example 15 includes the subject matter of any of Examples 10 through 13, wherein to obfuscate the identified first item of content includes to apply an overlay with distortion effects to the identified first item of content.

Example 16 includes the subject matter of any of Examples 10 through 13, wherein to obfuscate the identified first item of content includes to apply a transformation to the identified first item of content.

Example 17 includes the subject matter of any of Examples 10 through 13, wherein to obfuscate the identified first item of content includes to add an artifact to the identified first item of content.

Example 18 includes the subject matter of any of Examples 10 through 13, wherein to obfuscate the identified first item of content includes to redact the identified first item of content.

Example 19 includes the subject matter of any of Examples 10 through 18, wherein the one or more processors are further configured to: receive auxiliary information with the video stream; identify a second item of content in the video stream to shield from being viewable during rendering of the video stream, wherein to identify the second item of content in the video stream is based on the auxiliary information and a privacy protection policy; and obfuscate the identified second item of content in the video stream.

Example 20 includes the subject matter of any of Examples 10 through 18, wherein the one or more processors are further configured to: receive auxiliary information with the video stream, the auxiliary information including information associated with an operating system (OS) call on the first conference client device by an application executing on the first conference client device, and wherein to identify the first item of content in the video stream is based on the auxiliary information.

Example 21 includes the subject matter of any of Examples 10 through 18, wherein the one or more processors are further configured to: receive auxiliary information with the video stream, the auxiliary information including information regarding a window being generated by an application executing on the first conference client device, and wherein to identify the first item of content in the video stream is based on the auxiliary information.

Example 22 includes a method including: receiving from a first conference client device a video stream in a video conference session between at least a first participant and a second participant, wherein the first conference client device is associated with the first participant; determining that a screen sharing mode is activated at the first conference client device; identifying a first item of content in the video stream to shield from being viewable during rendering of the video stream based on a privacy protection policy; obfuscating the identified first item of content in the video stream; and providing the video stream showing the obfuscated first item of content to a second conference client device, wherein the second conference client device is associated with the second participant.

Example 23 includes the subject matter of Example 22, wherein the privacy protection policy is specified by the first participant.

Example 24 includes the subject matter of any of Examples 22 and 23, further including: receiving auxiliary information with the video stream; identifying a second item of content in the video stream to shield from being viewable during rendering of the video stream based on the auxiliary information and the privacy protection policy; obfuscating the identified second item of content in the video stream; and providing the video stream showing the obfuscated first item of content and the obfuscated second item of content to the second conference client device.

Example 25 includes the subject matter of any of Examples 22 and 23, further comprising receiving auxiliary information with the video stream, the auxiliary information including information associated with an operating system (OS) call on the first conference client device by an application executing on the first conference client device, and wherein identifying the first item of content in the video stream is based on the auxiliary information.

Example 26 includes the subject matter of any of Examples 22 and 23, further comprising receiving auxiliary information with the video stream, the auxiliary information including information regarding a window being generated by an application executing on the first conference client device, and wherein identifying the first item of content in the video stream is based on the auxiliary information.

Example 27 includes the subject matter of any of Examples 22 through 26, wherein obfuscating the identified first item of content in the video stream includes processing by a trained machine learning model.

Example 28 includes the subject matter of any of Examples 22 through 27, wherein obfuscating the identified first item of content includes one of adding a mosaic to the identified first item of content, applying an overlay with distortion effects to the identified first item of content, applying a transformation to the identified first item of content, adding an artifact to the identified first item of content, or redacting the identified first item of content.

Example 29 includes a system including a memory and one or more processors in communication with the memory and configured to: receive from a first conference client device a video stream in a video conference session between at least a first participant and a second participant, wherein the first conference client device is associated with the first participant; determine that a screen sharing mode is activated at the first conference client device; identify a first item of content in the video stream to shield from being viewable during rendering of the video stream based on a privacy protection policy; obfuscate the identified first item of content in the video stream; and provide the video stream showing the obfuscated first item of content to a second conference client device, wherein the second conference client device is associated with the second participant.

Example 30 includes the subject matter of Example 29, wherein the privacy protection policy is specified by the first participant.

Example 31 includes the subject matter of any of Examples 29 and 30, wherein the one or more processors are further configured to: receive auxiliary information with the video stream; identify a second item of content in the video stream to shield from being viewable during rendering of the video stream based on the auxiliary information and the privacy protection policy; obfuscate the identified second item of content in the video stream; and provide the video stream showing the obfuscated first item of content and the obfuscated second item of content to the second conference client device.

Example 32 includes the subject matter of any of Examples 29 and 30, wherein the one or more processors are further configured to: receive auxiliary information with the video stream, the auxiliary information including information associated with an operating system (OS) call on the first conference client device by an application executing on the first conference client device, and wherein to identify the first item of content in the video stream is based on the auxiliary information.

Example 33 includes the subject matter of any of Examples 29 and 30, wherein the one or more processors are further configured to: receive auxiliary information with the video stream, the auxiliary information including information regarding a window being generated by an application executing on the first conference client device, and wherein to identify the first item of content in the video stream is based on the auxiliary information.

Example 34 includes the subject matter of any of Examples 29 through 33, wherein to obfuscate the identified first item of content in the video stream includes processing by a trained machine learning model.

Example 35 includes the subject matter of any of Examples 29 through 34, wherein to obfuscate the identified first item of content includes one of to add a mosaic to the identified first item of content, to apply an overlay with distortion effects to the identified first item of content, to apply a transformation to the identified first item of content, to add an artifact to the identified first item of content, or to redact the identified first item of content.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
receiving, by a conference server device, a video stream of a first participant in a video conference session between at least the first participant and a second participant, wherein the first participant is associated with a first conference client device and the second participant is associated with a second conference client device;
receiving, by the conference server device, auxiliary information with the video stream, the auxiliary information including information associated with an operating system (OS) call on the first conference client device by an application executing on the first conference client device;
determining, by the conference server device, that the first participant is performing screen sharing;
identifying, by the conference server device, a first item of content in the video stream to shield from being viewable during rendering of the video stream, wherein identifying the first item of content in the video stream is based on the auxiliary information;
obfuscating, by the conference server device, the identified first item of content in the video stream; and
providing, by the conference server device, the video stream showing the obfuscated first item of content to the second conference client device to be rendered for display on a display device of the second conference client device.

2. The method of claim 1, wherein identifying the first item of content in the video stream to shield is based on a privacy protection policy.

3. The method of claim 2, wherein the privacy protection policy is specified by the first participant.

4. The method of claim 1, wherein obfuscating the identified first item of content in the video stream includes processing by a trained machine learning model.

5. The method of claim 1, wherein obfuscating the identified first item of content includes adding a mosaic to the identified first item of content.

6. The method of claim 1, wherein obfuscating the identified first item of content includes one of applying an overlay with distortion effects to the identified first item of content, applying a transformation to the identified first item of content, adding an artifact to the identified first item of content, or redacting the identified first item of content.

7. The method of claim 1, further comprising:
identifying a second item of content in the video stream to shield from being viewable during rendering of the video stream, wherein identifying the second item of content in the video stream is based on the auxiliary information and a privacy protection policy; and
obfuscating the identified second item of content in the video stream.

8. The method of claim 1, wherein the auxiliary information includes information regarding a window being generated by an application executing on the first conference client device.

9. A system comprising:
a conference server device including a memory and one or more processors in communication with the memory, and configured to:
receive a video stream of a first participant in a video conference session between at least the first participant and a second participant, wherein the first participant is associated with a first conference client device and the second participant is associated with a second conference client device;
receive auxiliary information with the video stream, the auxiliary information including information associated with an operating system (OS) call on the first conference client device by an application executing on the first conference client device;
determine that the first participant is performing screen sharing;
identify a first item of content in the video stream to shield from being viewable during rendering of the video stream, wherein to identify the first item of content in the video stream is based on the auxiliary information;
obfuscate the identified first item of content in the video stream; and
provide the video stream showing the obfuscated first item of content to the second conference client device to be rendered for display on a display device of the second conference client device.

10. The system of claim 9, wherein to identify the first item of content in the video stream to shield is based on a privacy protection policy.

11. The system of claim 10, wherein the privacy protection policy is specified by the first participant.

12. The system of claim 9, wherein to obfuscate the identified first item of content in the video stream includes use of a trained machine learning model.

13. The system of claim 9, wherein to obfuscate the identified first item of content includes one of to add a mosaic to the identified first item of content, to apply an overlay with distortion effects to the identified first item of content, to apply a transformation to the identified first item of content, to add an artifact to the identified first item of content, or to redact the identified first item of content.

14. The system of claim 9, wherein the one or more processors are further configured to:
identify a second item of content in the video stream to shield from being viewable during rendering of the video stream, wherein to identify the second item of content in the video stream is based on the auxiliary information and a privacy protection policy; and
obfuscate the identified second item of content in the video stream.

15. The system of claim 9, wherein the auxiliary information includes information regarding a window being generated by an application executing on the first conference client device.

16. A method comprising:
receiving, by a conference server device, from a first conference client device a video stream in a video conference session between at least a first participant and a second participant, wherein the first conference client device is associated with the first participant;

receiving, by the conference server device, auxiliary information with the video stream, the auxiliary information including information associated with an operating system (OS) call on the first conference client device by an application executing on the first conference client device;

determining, by the conference server device, that a screen sharing mode is activated at the first conference client device;

identifying, by the conference server device, a first item of content in the video stream to shield from being viewable during rendering of the video stream based on a privacy protection policy, wherein identifying the first item of content in the video stream is based on the auxiliary information;

obfuscating, by the conference server device, the identified first item of content in the video stream; and providing, by the conference server device, the video stream showing the obfuscated first item of content to a second conference client device, wherein the second conference client device is associated with the second participant.

17. The method of claim 16, wherein the privacy protection policy is specified by the first participant.

18. The method of claim 16, further comprising:

identifying a second item of content in the video stream to shield from being viewable during rendering of the video stream based on the auxiliary information and the privacy protection policy;

obfuscating the identified second item of content in the video stream; and providing the video stream showing the obfuscated first item of content and the obfuscated second item of content to the second conference client device.

* * * * *